United States Patent
Tawarada et al.

(10) Patent No.: US 7,624,713 B2
(45) Date of Patent: Dec. 1, 2009

(54) MOUNTING STRUCTURE FOR AN OIL LEVEL SIGHT GLASS FOR AN INTERNAL COMBUSTION ENGINE AND ENGINE INCORPORATING SAME

(75) Inventors: Yuichi Tawarada, Saitama (JP); Tsuyoshi Arima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 11/821,690

(22) Filed: Jun. 25, 2007

(65) Prior Publication Data

US 2008/0006086 A1 Jan. 10, 2008

(30) Foreign Application Priority Data

Jul. 6, 2006 (JP) .............................. 2006-186177

(51) Int. Cl.
*F01M 1/02* (2006.01)
*G01F 23/02* (2006.01)
(52) U.S. Cl. ..................................... 123/196 R; 73/323
(58) Field of Classification Search ............. 123/196 R, 123/195 R, 195 C, 198 R, 196 CP; 73/323; 116/227; 184/96, 97
See application file for complete search history.

(56) References Cited

U.S. PATENT DOCUMENTS

| 3,000,345 | A | * | 9/1961 | Gray, Jr. et al. ............. 116/206 |
| 3,466,928 | A | * | 9/1969 | Kind ............................ 73/293 |
| 4,335,825 | A | * | 6/1982 | Sakazume .................... 220/663 |
| 4,376,490 | A | * | 3/1983 | Mizusaki ..................... 220/663 |
| 5,103,648 | A | * | 4/1992 | Barbier ......................... 62/126 |
| 2001/0018301 | A1 | * | 8/2001 | Ikuma et al. .................. 440/77 |

FOREIGN PATENT DOCUMENTS

JP 2000-282837 10/2000

\* cited by examiner

*Primary Examiner*—Michael Cuff
*Assistant Examiner*—Hung Q Nguyen
(74) *Attorney, Agent, or Firm*—Carrier, Blackman & Associates, P.C.; William D. Blackman; Joseph P. Carrier (57) ABSTRACT

A crankcase having a mounting structure configured to receive an oil level sight glass fitted on a lower outer portion of the crankcase in a through hole formed therein, and a retainer member clamped to an outer surface of the crankcase to prevent the oil level sight glass from falling off. An outwardly protrudingly rib is formed on the outer portion of the crankcase which is engaged with a cut formed on the retainer member to securely position the retainer member on the crankcase. The retainer member includes a scale mark provided thereon, and the oil level sight glass permits visual observation for checking an oil level of oil held in an oil reservoir disposed at the lower portion of the crankcase.

16 Claims, 6 Drawing Sheets

MOUNTING STRUCTURE FOR AN OIL LEVEL SIGHT GLASS FOR AN INTERNAL COMBUSTION ENGINE AND ENGINE INCORPORATING SAME

CROSS-REFERENCE TO RELATED APPLICATIONS

The present application claims priority under 35 USC §119 based on Japanese patent application No. 2006-186177, filed on Jul. 6, 2006. The entire subject matter of this priority document is herein incorporated by reference.

BACKGROUND OF THE INVENTION

1. Field of the Invention

The present invention relates to a mounting structure for an oil level sight glass for visually observing an amount of oil held in a reservoir of an internal combustion engine. More particularly, the present invention relates to a crankcase having a mounting structure configured to receive engine oil level sight glass, and a retainer member for holding the oil level sight glass.

2. Description of the Background Art

A number of monitoring structures for an oil level sight glass for internal combustion engines of motorcycles are known. An example of a mounting structure for an oil level sight glass is disclosed in the Japanese patent document JP-A No. 2000-282837.

According to the Japanese patent document JP-A No. 2000-282837, the mounting structure for the oil level sight glass, for an engine of a motorcycle, includes a body which is attached to the engine. The body includes a communication chamber which communicates with an oil reservoir, and a sight glass portion which covers an end portion of the communication chamber. The body has scale marks provided at the periphery of its end portion to indicate the level of oil held in a reservoir of the internal combustion engine.

The body with the sight glass portion pre-fitted therein is mounted striding a crankcase and an oil pan of an internal combustion engine. The body is positioned abutting the crankcase and the oil pan such that an upper communication port and a lower communication port of the body are connected to a through hole formed in the crankcase and a communication hole of the oil pan, respectively. The oil level sight glass is attached to the engine by bolting two downwardly projectingly bolting parts formed on the body to the oil pan surface.

Generally, when a same type of internal combustion engine is commonly used for different types of motorcycles, the position in which the engine is mounted may differ between differently configured motorcycles. Particularly, in a case where an internal combustion engine is mounted transversally on a motorcycle with its crankshaft oriented in a vehicle width direction, the direction in which the cylinders of the engine protrude from the crankcase differs, and hence the position in which the engine is mounted may differ depending on the type of motorcycle.

When the position of mounting of an internal combustion engine changes, even though the oil level of the engine can be viewed through the oil level sight glass attached to the oil pan or the crankcase, the scale marks provided on the oil level sight glass for checking the oil level may not provide correct measure of oil level in the engine, and can no longer be used as a criterion to correctly measure the oil level in the engine.

In such a case, it is necessary to replace the scale marks of the oil level sight glass to correctly check the oil level in the engine. However, in the case of the oil level sight glass disclosed in the patent document JP-A No. 2000-282837, the scale marks provided on the body can not be replaced, when required. In such situations, a replacement of the body of the oil level sight glass with appropriate scale marks is required. Since the body has a sight glass portion pre-fitted therein, replacing the body makes it necessary to replace the sight glass portion, too. In other words, the oil level sight glass as disclosed in JP-A No. 2000-282837 may not be used when engines are mounted in different positions on different motorcycles.

Accordingly, an object of the present invention that has been made in view of the above situation is to provide a versatile mounting structure for an oil level sight glass for an internal combustion engine, the mounting structure allowing the oil level sight glass to be used commonly between internal combustion engines mounted in different positions on different motorcycles and also allowing appropriate scale marks to be easily provided.

SUMMARY OF THE INVENTION

To achieve the above object, the present invention according to a first aspect provides a mounting structure for an oil level sight glass for an internal combustion engine, the oil level sight glass being for visually observing, by checking an oil level, an amount of oil held in an oil reservoir provided in a lower portion of a crankcase of an internal combustion engine. In the mounting structure, the oil level sight glass is fitted at portion of the engine in a through hole formed in a lower portion of a vertical side wall of a crankcase is pressed, not to fall off, from outside by a retainer member clamped to an outer surface of the vertical side wall, and the retainer member has a scale mark provided thereon.

The present invention according to a second aspect provides the mounting structure for an oil level sight glass for an internal combustion engine having the oil level sight glass press-fitted in the through hole formed in the vertical side wall of the crankcase.

The present invention according to a third aspect provides the mounting structure for an oil level sight glass for an internal combustion engine having an outwardly protrudingly rib formed on the vertical side wall of the crankcase and a cut formed on the retainer member. The cut engages the rib to position the retainer member on the outer portion of the crankcase.

The present invention according to a fourth aspect provides the mounting structure for an oil level sight glass for an internal combustion engine in which a direction of clamping by a clamping part using a bolt of the crankcase is perpendicular to a direction of pressing by the retainer member, and in the direction of pressing by the retainer member, an extension of a clamping axis of the clamping part of the crankcase overlaps the oil level sight glass, when the extension is shifted from a clamping part of the retainer member.

In the mounting structure for an oil level sight glass for an internal combustion engine according to the first aspect, the oil level sight glass fitted from outside in a through hole formed in a vertical side wall of the crankcase is pressed, not to fall off, from outside by a retainer member clamped to an outer surface of the vertical side wall, and the retainer member has a scale mark provided thereon. Therefore, even when the position in which the internal combustion engine is mounted on a vehicle changes, an appropriate scale mark to be used as a criterion for checking the oil level can be easily provided by replacing the retainer member only, while leaving the oil level sight glass unchanged. Thus, the mounting structure is superior in versatility.

In the mounting structure for an oil level sight glass for an internal combustion engine according to the second aspect, the oil level sight glass is press-fitted in the through hole formed in the vertical side wall of the crankcase. This requires application of a very small load, which is provided by the retainer member, to retain the oil level sight glass in the crankcase and to prevent it from falling off. Therefore, the clamping part of the retainer member need not be large, the number of clamping bosses to be formed can be kept minimum, and the oil level sight glass and retainer member can be made light in weight.

In the mounting structure for an oil level sight glass for an internal combustion engine according to the third aspect, a cut formed on the retainer member engages a rib protrudingly formed on the vertical side wall of the crankcase to position the retainer member on the crankcase. The retainer member can therefore be clamped, in a precisely positioned state, to the crankcase without requiring many clamping members.

In the mounting structure for an oil level sight glass for an internal combustion engine according to the fourth aspect, a direction of clamping by a clamping part using a bolt of the crankcase is perpendicular to a direction of pressing by the retainer member, and direction of pressing by the retainer member, an extension of a clamping axis of the clamping part of the crankcase overlaps the oil level sight glass, the extension being shifted from a clamping part of the retainer member. The bolt for the clamping part of the crankcase can therefore be screwed in or removed from the clamping part without removing the retainer member. This improves the workability, including installation and maintenance of the crankcase including the oil level sight glass.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE ILLUSTRATIVE EMBODIMENTS

A few selected illustrative embodiments of the present invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

An embodiment of the present invention is described with reference to FIGS. 1 to 9.

Figure 1:
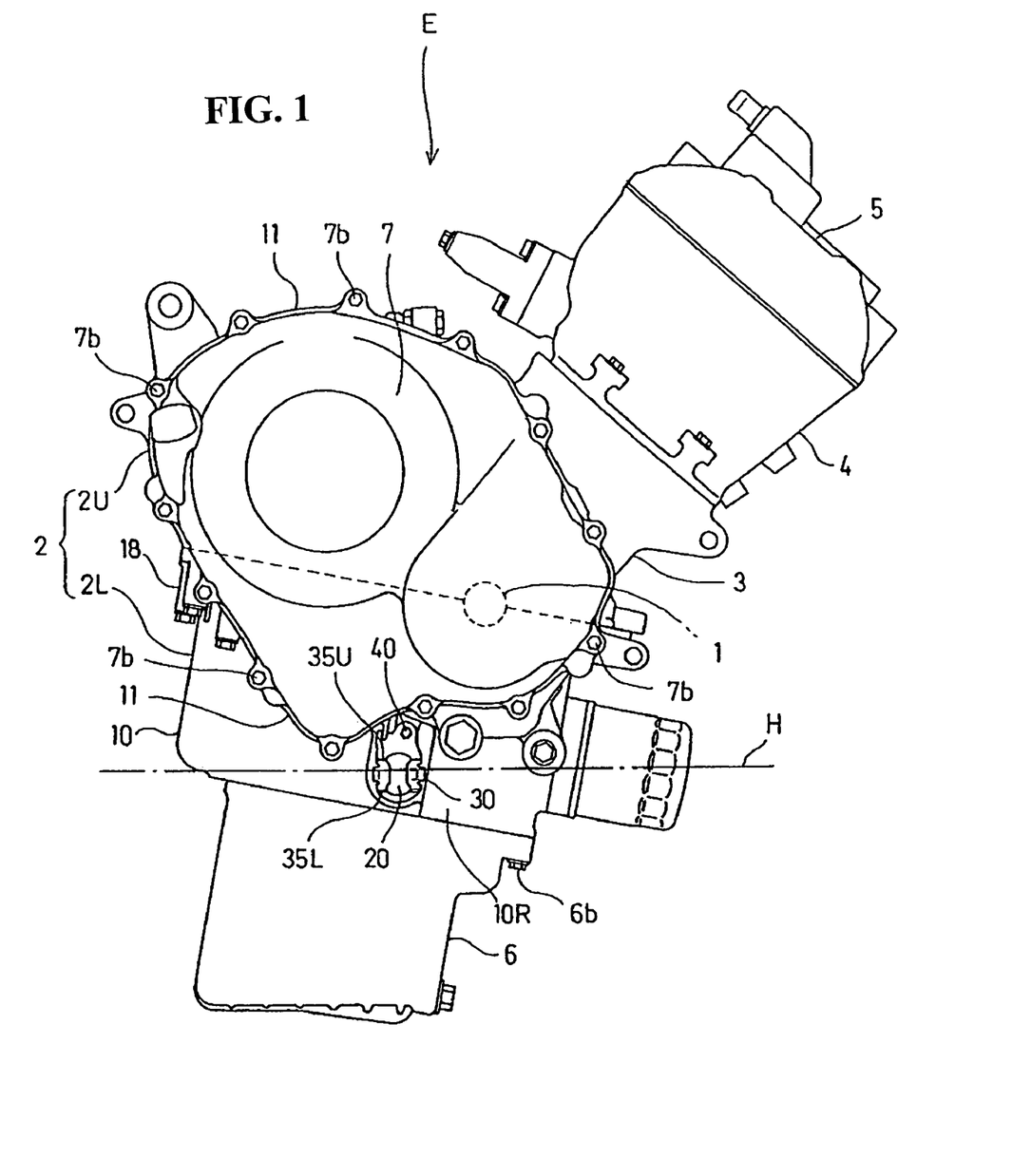
FIG. 1 is a right side view of an internal combustion engine according to an embodiment of the present invention.

FIG. 1 is a right side view of the internal combustion engine E. The internal combustion engine E according to an embodiment of the present invention is a water-cooled, inline four-cylinder, four-stroke engine. The engine is mounted transversally on a motorcycle with a crankshaft 1 oriented in a vehicle (motorcycle) width direction.

In the following description of the present embodiment, front, rear, left, right, upper, and lower parts and portion are defined with respect to a forward travel, normal moving direction of the motorcycle.

As shown in FIG. 1, the engine includes a crankcase 2 to which the crankshaft 1 is journaled. The crankcase 2 includes an upper part 2U (also referred as an upper crankcase) and a lower part 2L (also referred as a lower crankcase). On the upper crankcase 2U, a cylinder block 3 and a cylinder head 4 disposed over the cylinder block 3 are positioned somewhat forwardly inclined from a vertical direction. The cylinder block 3 integrally includes four inline cylinders. A cylinder head cover 5 is disposed on top of the cylinder head 4. An oil pan 6 is provided under the lower crankcase 2L.

Figure 2:
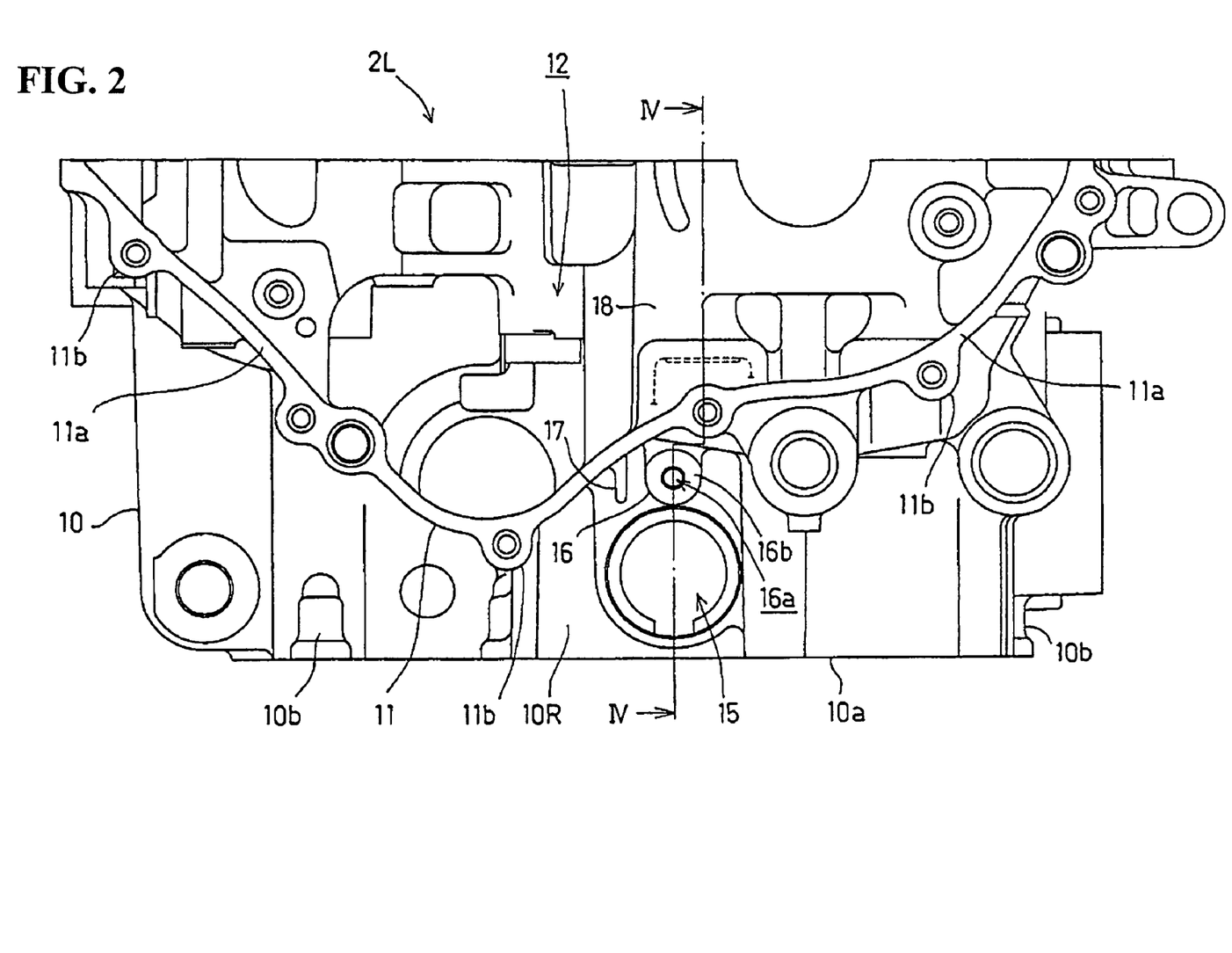
FIG. 2 is a right side view of a lower crankcase.
Figure 3:
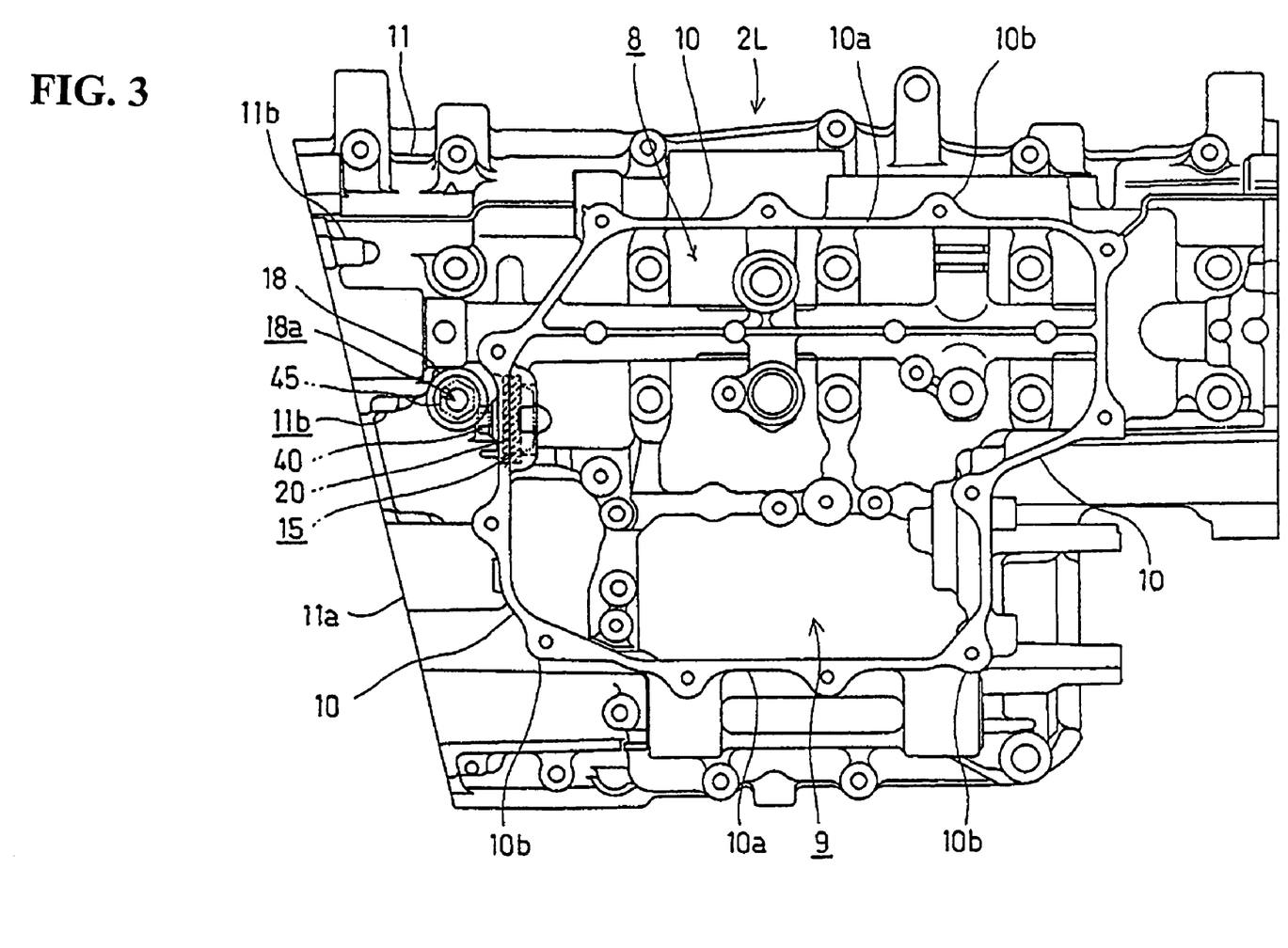
FIG. 3 is a bottom view of the lower crankcase.

FIGS. 2 and 3 are a right side view and a bottom view of the lower crankcase 2L, respectively.

An upper half of the lower crankcase 2L makes up, together with the upper crankcase 2U, a crank chamber 8 and a transmission chamber 9. A lower half of the lower crankcase 2L makes up a downwardly extending substantially cylindrical connection wall 10 having front, rear, left, and right side walls. The crank chamber 8 and transmission chamber 9 above the lower half of the lower crankcase 2L are configured to communicate internally, via the cylindrical connection wall 10, with the oil pan 6 provided under the lower crankcase 2L. The cylindrical connection wall 10 serves as an oil passage through which oil having lubricated engine parts requiring lubrication returns to the oil pan 6. A portion of the cylindrical connection wall 10 makes up, together with the oil pan 6, an oil reservoir.

The cylindrical connection wall 10 includes a mating face 10a formed at an open lower end thereof. The mating face 10a includes fixing bosses 10b bulgingly formed at plural locations (see FIG. 3). The oil pan 6 is shaped like a bowl and has a mating face formed at an open upper end thereof. The mating face of the oil pan 6 is fitted to the mating face 10a of the connection wall 10 from below, and the two mating faces are clamped together with bolts 6b.

The oil, reservoir is made up mainly of the interior of the oil pan 6 and extends up to the interior of the cylindrical connection wall 10 of the lower crankcase 2L. When an appropriate amount of oil is held in the oil reservoir, the oil level H is in a lower portion of the connection wall 10 as shown in FIG. 1.

A cylindrical wall 11 protrudes rightwardly from the right side walls of the upper and lower crankcases 2U and 2L thereby forming a concave portion 12 for accommodating a power transmission mechanism including a clutch.

The cylindrical wall 11 has a mating face 11a formed at an open right end thereof. The mating face 11a includes fixing bosses 11b bulgingly formed at plural locations (see FIG. 2). A clutch cover 7 is shaped like a bowl and has a mating face formed at an open left end thereof The mating face of the clutch cover 7 internally accommodating the power transmission mechanism is fitted to the mating face 11a from the right side, and the two mating faces are clamped together with bolts 7b (see FIG. 1).

As shown in FIGS. 2 and 3, a circular hole 15 (also referred as a through hole) for having an oil level sight glass 20 fitted therein is formed through a right vertical side wall 10R of the cylindrical connection wall 10. In an embodiment, the through hole 15 may be rectangular, triangular, hexagonal, or square, on any other suitable shape.

The circular through hole 15 is positioned between the cylindrical wall 11, protruding from the right vertical side wall 10R of the connection wall 10, and the mating face 10a formed at the open lower end of the connection wall 10. The circular hole is disposed in a lower portion of the right vertical side wall 10R adjacent to the mating face 10a.

A clamping boss 16 is formed, on the right vertical side wall 10R, between the circular hole 15 and the cylindrical wall 11 above the circular hole 15 such that it bulges downwardly and continuously from a base portion of the cylindrical wall 11 (see FIG. 2). A screw hole 16a is formed through the clamping boss 16. The screw hole 16a has an open end face formed as a seat 16b which is slightly more protruding than the open end face of the circular hole 15.

A rib 17 is formed proximately behind the clamping boss 16 (at left as seen in FIG. 2) such that it downwardly protrudes from the base portion of the cylindrical wall 11 on the vertical side wall 10R.

Figure 4:
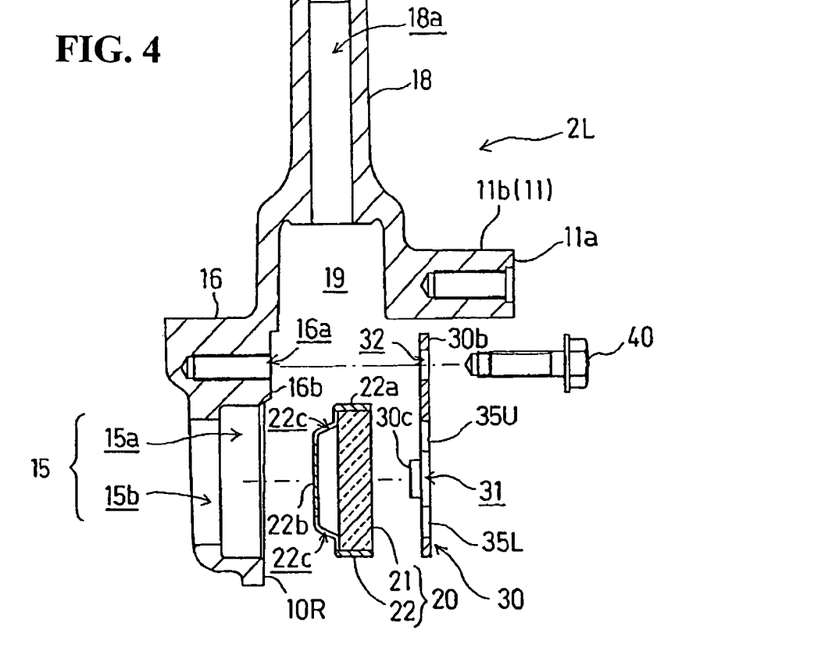
FIG. 4 shows a cross-sectional view (taken along line IV-IV in FIG. 2) of an essential part of the lower crankcase and cross-sectional views of an oil level sight glass and a retainer plate both in a detached state.

Referring to FIG. 4, the oil level sight glass 20 includes a circular disk-like transparent glass plate 21 and a holder 22 which holds the transparent glass plate 21. The holder 22 is shaped like a bowl. The holder includes a frame portion 22a having a substantially cylindrical shape and a bottom plate 22b with plural through holes 22c formed between the frame portion 22a and the bottom plate 22b. The frame portion 22a holds the transparent glass plate 21 fitted against its inner circumference.

The circular hole 15 formed through the right vertical side wall 10R includes an outer circular hole 15a having a first diameter, and an inner circular hole 15b having a second diameter which is smaller than the first diameter of the outer circular hole 15b (i.e., the first diameter>the second diameter). To fit the holder 22, that holds the transparent glass plate 21 in the circular hole 15, the bottom plate 22b is inserted in the inner circular hole 15b from outside and, at the same time, the frame portion 22a is press-fitted in the outer circular hole 15a.

The frame portion 22a of the holder 22 and the outer circular hole 15a of the circular hole 15 are approximately equal in axial length, so that the frame portion 22a can be entirely press-fitted in the outer circular hole 15a.

A retainer plate 30 (also referred as a retainer member) is placed against the press-fitted oil level sight glass 20 from outside to prevent the oil level sight glass 20 from falling.

Figure 7:
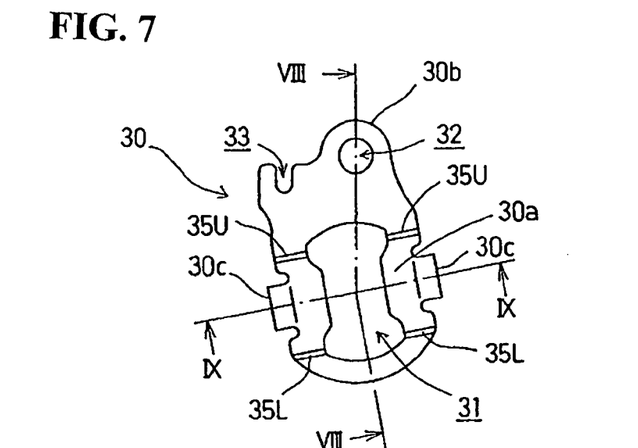
FIG. 7 is a side view of the retainer plate.
Figure 8:
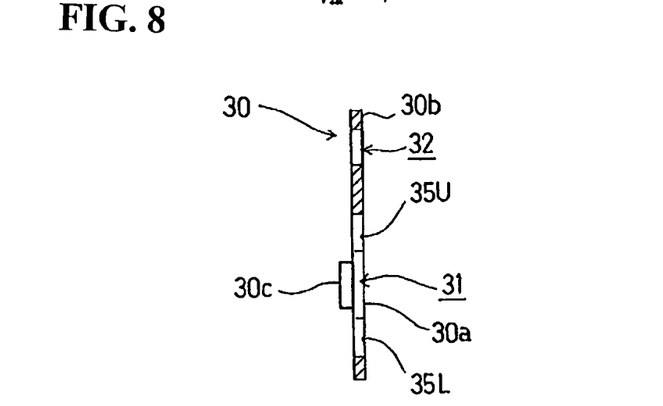
FIG. 8 is a cross-sectional view taken along line VIII-VIII in FIG. 7.
Figure 9:
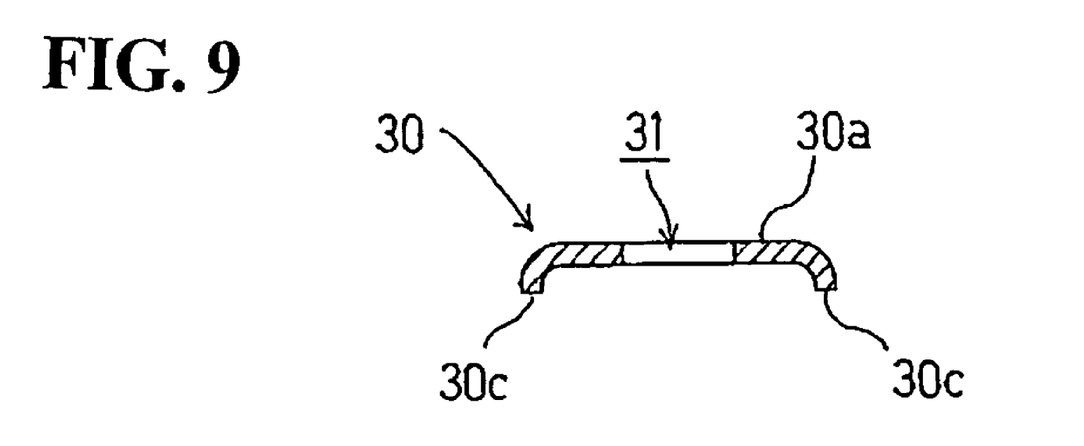
FIG. 9 is a cross-sectional view taken along line IX-IX in FIG. 7.

As shown in FIGS. 7 to 9, the retainer plate 30 is shaped longer vertically than horizontally. The retainer plate 30 excluding its upper portion is mostly made up of an oblong portion 30a. The retainer plate 30 has a hollow portion. That is, a vertically long, approximately rectangular hole 31 (with top and bottom portions somewhat wider than the other portion) is formed through a center portion of the oblong portion 30a. The upper portion of the retainer plate 30 is formed as a clamping part 30b (also referred as a clamping portion) having a bolt hole 32.

A downward cut 33 is formed in a rear portion (left portion as seen in FIG. 7) of the clamping part 30b in the upper portion of the retainer plate 30. Front and rear side edges (left and right side edges as seen in FIG. 7) of the oblong portion 30a of the retainer plate 30 are each partly bent back thereby forming a pair of front and rear pressing tabs 30c which are mutually symmetrical and slightly protrude from the back side of the retainer plate 30.

As shown in FIG. 7, an upper limit scale mark 35U and a lower limit scale mark 35L, which are parallel to each other, are linearly engraved at predetermined locations on the outer surface of the oblong portion 30a of the retainer plate 30 such that they are equidistantly away from the center of the oblong hole 31 with the upper limit scale mark 35U upwardly away and the lower limit scale mark 35L downwardly away therefrom.

The retainer plate 30 is designed such that the oblong hole 31 corresponds to the circular hole 15 formed through the right vertical side wall 10R of the connection wall 10 provided in a lower portion of the lower crankcase 2L and such that the clamping part 30b and the cut 33 positionally correspond to the clamping boss 16 and the rib 17, respectively.

To position the retainer plate 30, after the oil level sight glass 20 has been press-fitted in the circular hole 15 formed through the right vertical side wall 10R, as described above, the retainer plate 30 is placed against the oil level sight glass 20 from outside (i.e., not from inside the engine) such that the clamping part 30b of the retainer plate 30 abuts the seat 16b of the clamping boss 16 (formed, on the right vertical side wall 10R) with the bolt hole 32 and the screw hole 16a aligned with each other; the bolt 40 is inserted through the bolt hole 32; and the cut 33 and the rib 17 are engaged with each other. It will be understood from FIGS. 4-5 that, an outer portion of the oil level sight glass 20 is covered by the retainer member 30, and an inner portion of the oil level sight glass is covered by a portion of the lower portion of the crankcase 2L.

Figure 5:
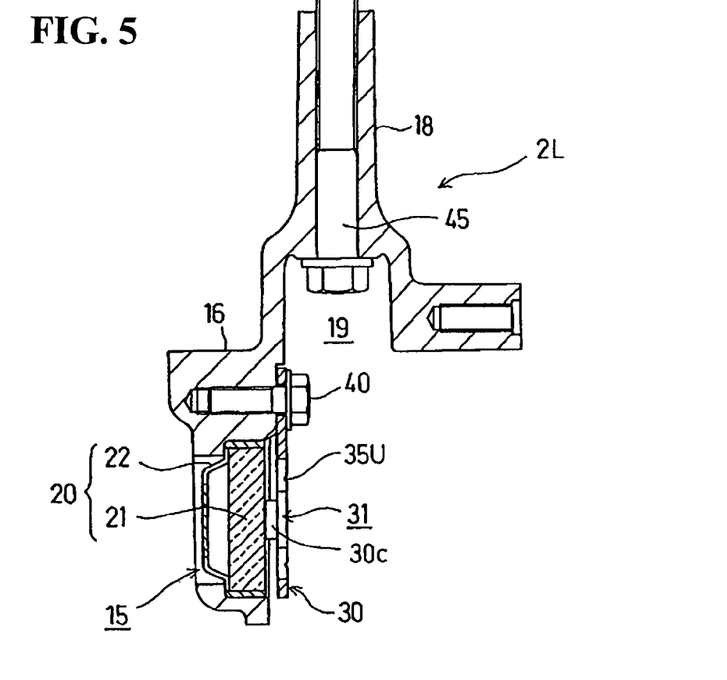
FIG. 5 is a cross-sectional view of an essential part of the lower crankcase to which the oil level sight glass is attached.

With the retainer plate 30 positioned as described above, the front and rear pressing tabs 30c formed in the oblong portion 30a of the retainer plate 30 press the outside edge of the frame portion 22a of the oil level sight glass 20. In this state, the bolt 40 inserted through the bolt hole 32 is clamped by screwing into the screw hole 16a.

Figure 6:
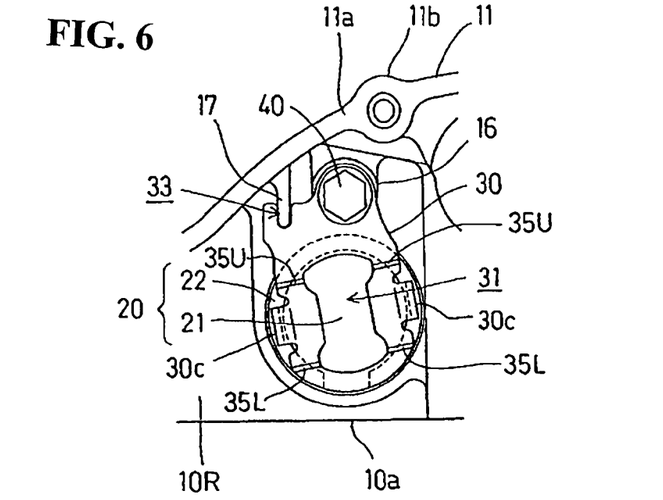
FIG. 6 is a right side view of an essential part of the lower crankcase to which the oil level sight glass is attached.

Referring to FIG. 6 showing a side view of lower crankcase 2L to which the oil level sight glass is attached, the downward cut 33, of the retainer plate, with an open top portion is engaged with the rib 17 on the left side where the bolt 40 is clamped to the lower crankcase 2L. When the bolt 40 is turned clockwise for tightening, the retainer plate 30 is subjected to a force directed to cause the rib 17 to be engaged in the cut 33 more tightly. This causes the retainer plate 30 to be positioned more precisely.

When the retainer plate 30 is attached, being precisely positioned, to a lower portion of the lower crankcase 2L, the upper limit scale mark 35U and lower limit scale mark 35L engraved on the retainer plate 30 become parallel to the oil level H of the internal combustion engine E of the motorcycle.

As described above, clamping the retainer plate 30 to the right vertical side wall 10R by tightening the bolt 40 at one location of the clamping part 30b precisely positions the retainer plate 30 allowing the front and rear pressing tabs 30c of the oblong portion 30a to press the frame portion 22a of the oil level sight glass 20 so as to prevent the oil level sight glass 20 from falling off.

The oil held inside the connection wall 10 reaches the inside surface of the transparent glass plate 21 of the oil level sight glass 20 attached to the lower portion of the lower crankcase 2L via the through holes 22c formed in the holder 22. Hence, the oil level H of the oil inside the connection wall 10 of the lower crankcase 2L can be viewed from outside through the transparent glass plate 21.

The oil level H is appropriate when it is between the upper scale mark 35U and lower scale mark 35L engraved on the retainer plate 30 as shown in FIG. 1.

In the mounting structure for the oil level sight glass 20 according to the present embodiment, the oil level sight glass 20 press-fitted in the circular hole 15 formed through the right vertical side wall 10R of the lower crankcase 2L is pressed by the retainer plate 30 clamped to the right vertical side wall 10R, so as to prevent falling of the oil level sight glass 20. The upper limit scale mark 35U and lower limit scale mark 35L can be used as oil level criteria when visually checking the oil level H are engraved on the retainer plate 30.

In a case where the internal combustion engine E according to the present embodiment is mounted on a different motorcycle causing the internal combustion engine E to be forwardly inclined differently than in the present embodiment, the upper limit scale mark 35U and lower limit scale mark 35L engraved on the retainer plate 30 attached to the lower portion of the lower crankcase 2L do not become parallel to the oil level H. In such a case, the upper limit scale mark 35U and lower limit scale mark 35L cannot be reliable oil level criteria, so that it is necessary to use different scale marks.

With the mounting structure for the oil level sight glass 20, as described above, oil level scale marks which can be used as criteria in visually checking the oil level of the different motorcycle can be obtained easily just by replacing the retainer plate 30 with a suitable retainer plate, having appropriate scale marks thereon, for the inclination of the internal combustion engine E mounted on different motorcycle while leaving the oil level sight glass 20 press-fitted in the circular hole 15 as it is.

Thus, the oil level sight glass can be used commonly between internal combustion engines mounted in different positions just by replacing the retainer plate as required. Thus, the oil level sight glass mounting structure according to the present embodiment is superior in versatility.

With the oil level sight glass 20 press-fitted in the circular hole 15 formed through the right vertical side wall 10R of the lower crankcase 2L, a small load is applied by the retainer plate 30 by pressing the oil level sight glass 20 to prevent it from falling. Therefore, the clamping part 30b of the retainer plate 30 need not be large. This makes the clamping boss 16 alone enough to clamp the retainer plate 30, so that the oil level sight glass 20 can be kept light in weight.

The retainer plate 30 is positioned by having the rib 17 that is protrudingly formed on the right vertical side wall 10R of the lower crankcase 2L engaged in the cut 33 formed on the retainer plate 30, so that the retainer plate 30 can be clamped, in a precisely positioned state, to the lower crankcase 2L with the single bolt 40.

The clamping boss 16 for clamping the retainer plate 30 is formed to be proximate and continuous to the cylindrical wall 11 of the concave portion 12 accommodating the power transmission mechanism. The strength and rigidity of the clamping boss 16 can therefore be secured easily without making it larger.

As shown in FIGS. 4 and 5, one of clamping bosses 18 for coupling the lower crankcase 2L to the upper crankcase 2U is formed upward of the clamping boss 16 formed on the cylindrical wall 11 of the lower crankcase 2L. The clamping boss 18 protrudes upwardly from a concave portion 19 formed by hollowing a base portion of the cylindrical wall 11.

A journal bolt 45 is inserted from below through a bolt hole 18a formed through the clamping boss 18 and screwed into the upper crankcase 2U for tightening.

Referring to FIG. 5, a head of the journal bolt 45 is positioned inside the concave portion 19, so that the journal bolt 45 having been tightened does not interfere with loosening, removing, and screwing of the bolt 40 carried out when replacing the retainer plate 30. Thus, the retainer plate 30 can be replaced efficiently without requiring the journal bolt 45 to be removed.

Referring to FIGS. 3 and 5, in an installed configuration, where the retainer plate 30 is clamped by the bolt 40 to the right vertical side wall 10R of the lower crankcase 2L with the oil level sight glass 20 positioned where it has been pressed in, the retainer plate 30 having a hollow center oblong portion 30a has no outwardly protruding parts, and the head of the bolt 40 does not much protrude outwardly.

Furthermore, even though, when seen in the direction of pressing by the retainer plate 30 (see FIG. 2), an extension of the clamping axis of the journal bolt 45 (section line of the clamping boss 18 in FIG. 2) overlaps the oil level sight glass 20 (the circular hole 15 in FIG. 2), with the seat 16b of the clamping boss 16 for the retainer plate 30 shifted from the extension, neither the bolt 40 nor the retainer plate 30 interferes with the journal bolt 45 when it is screwed in or removed (see two-dot chain line in FIG. 3). Thus, it is possible to screw in or remove the journal bolt 45 with the oil level sight glass 20 pressed in position by the retainer plate 30. Thus, the oil level sight glass mounting structure according to the present embodiment is superior in workability including installation and maintenance thereof.

As described above, even in a state where the oil level sight glass 20 press-fitted in the circular hole 15 formed through the right vertical side wall 10R is pressed by the retainer plate 30, not to fall off, the retainer plate 30 is clamped only at the single clamping boss 16 without using any largely outwardly protruding parts. This, in a case where a clamping part to use a bolt other than the journal bolt 45 is to be formed, increases layout flexibility and makes layout easier.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A crankcase for an internal combustion engine, said crankcase comprising a mounting structure for an oil level sight glass for the internal combustion engine, said mounting structure configured to receive an oil level sight glass fitted on an outer portion of the crankcase in a through hole formed in a lower portion of a vertical side wall of the crankcase;

an outwardly-protruding rib formed on the vertical side wall of the crankcase; and a retainer member clamped to an outer surface of the vertical side wall to prevent the oil level sight glass from falling off; said retainer member having a cut formed thereon;

wherein:

the retainer member has a scale mark provided thereon;

said cut engages the rib for positioning the retainer member on the outer surface of the vertical wall; and the oil level sight glass permits visual observation for checking an oil level of oil held in an oil reservoir disposed at a lower portion of the crankcase.

2. A crankcase for an internal combustion engine according to claim 1, wherein the oil level sight glass is press-fitted in the through hole formed in the vertical side wall.

3. A crankcase for an internal combustion engine according to claim 1, further comprising an intermediate clamping part disposed between a lower part and an upper part of the crankcase; wherein
 the retainer member comprises a clamping portion, said clamping portion includes a bolt hole formed therein; and
 the crankcase has a threaded hole formed therein to receive a bolt for holding the retainer member thereon via the bolt hole;
 wherein a direction of clamping the retainer member to the crankcase by the clamping portion using the bolt is perpendicular to a direction of the intermediate clamping part disposed between a lower part and an upper part of the crankcase; and
 an extension of a clamping axis of said intermediate clamping part overlaps the oil level sight glass, said extension being shifted from the clamping portion of the retainer member.

4. A crankcase for an internal combustion engine according to claim 2, further comprising an intermediate clamping part disposed between a lower part and an upper part of the crankcase; wherein
 the retainer member comprises a clamping portion, said clamping portion includes a bolt hole formed therein; and
 the crankcase has a threaded hole formed therein to receive a bolt for holding the retainer member thereon via the bolt hole;
 wherein a direction of clamping the retainer member to the crankcase by the clamping portion using the bolt is perpendicular to a direction of the intermediate clamping part disposed between a lower part and an upper part of the crankcase; and
 an extension of a clamping axis of said intermediate clamping part overlaps the oil level sight glass, said extension being shifted from the clamping portion of the retainer member.

5. An internal combustion engine having a crankcase comprising a mounting structure for an oil level sight glass for the engine, said crankcase having an outwardly protruding rib formed thereon;
 said mounting structure comprising:
 a lower portion of the crankcase of the engine, said portion having a through hole formed therein; said through hole configured to receive the oil level sight glass therein; and
 a retainer member clamped to the portion of the crankcase; said retainer member having a cut formed thereon; said retainer member provided for covering and retaining the oil level sight glass received in the through hole;
 wherein said retainer member includes scale marks provided thereon which indicate oil level in the engine; and
 wherein said cut engages the rib for positioning the retainer member on a portion of the crankcase.

6. An internal combustion engine according to claim 5, wherein said through hole is formed of an outer circular hole having a first diameter and an inner circular hole having a second diameter; wherein the second diameter is less than the first diameter.

7. An internal combustion engine according to claim 6, wherein said oil level sight glass includes a glass plate and a holder which holds the glass plate, said holder includes a frame portion having substantially equal diameter as that of the first diameter of the outer circular hole.

8. An internal combustion engine according to claim 5, wherein said oil level sight glass includes a circular glass plate and a bowl-shaped holder; said holder having a bottom plate and a frame portion holding the glass plate.

9. An internal combustion engine according to claim 8, wherein the scale marks includes an upper limit and lower limit marks.

10. A crankcase for an internal combustion engine, said crankcase comprising
 an outwardly protruding rib formed on a lower wall portion thereof;
 an mounting structure configured to receive an oil level sight glass therein; and
 a retainer member clamped to an outer surface of the crankcase so as to prevent the oil level sight glass received in the through hole from falling off; said retainer member having a cut formed thereon;
 wherein:
 said mounting structures includes the lower wall portion of the crankcase having a through hole formed therein;
 said cut engages the rib for positioning the retainer member on the crankcase;
 said oil level sight glass is press-fitted in the through hole; and
 the retainer member has scale marks provided thereon.

11. A crankcase for an internal combustion engine according to claim 10, wherein the oil level sight glass includes a glass plate formed of transparent material permitting visual observation of an oil level of oil held in an oil reservoir disposed at a lower portion of the crankcase.

12. A crankcase for an internal combustion engine according to claim 11, wherein said through hole is formed of an outer circular hole having a first diameter and an inner circular hole having a second diameter; wherein the second diameter is less than the first diameter.

13. A crankcase for an internal combustion engine according to claim 12, wherein said oil level sight glass includes a holder which holds the glass plate, said holder includes a frame portion having substantially equal diameter as that of the first diameter of the outer circular hole.

14. A crankcase for an internal combustion engine according to claim 10, further comprising an intermediate clamping part disposed between a lower part and an upper part of the crankcase;
 wherein the retainer member comprises a clamping portion, said clamping portion includes a bolt hole formed therein; and
 the crankcase has a threaded hole formed therein to receive a bolt for holding the retainer member thereon via the bolt hole;
 wherein a direction of clamping the retainer member to the crankcase by the intermediate clamping portion using the bolt is perpendicular to a direction of the clamping part disposed between the lower part and the upper part of the crankcase.

15. A crankcase for an internal combustion engine according to claim 14, wherein the clamping part and retainer are spaced apart.

16. A crankcase for an internal combustion engine, said crankcase comprising
 a mounting structure for an oil level sight glass for the internal combustion engine,
 said mounting structure configured to receive an oil level sight glass fitted on an outer portion of the crankcase in a through hole formed in a lower portion of a vertical side wall of the crankcase; and
 a retainer member clamped to an outer surface of the vertical side wall to prevent the oil level sight glass from falling off;

wherein:

the retainer member has a scale mark provided thereon;

the oil level sight glass permits visual observation for checking an oil level of oil held in an oil reservoir disposed at a lower portion of the crankcase; and an outer portion of said oil level sight glass is covered by said retainer member, and an inner portion of said oil level sight glass is covered by a portion of said lower portion of the vertical side wall of the crankcase.

* * * * *